US012013196B2

(12) United States Patent
Bordoni et al.

(10) Patent No.: US 12,013,196 B2
(45) Date of Patent: Jun. 18, 2024

(54) INTEGRATED COOLING SUB-SYSTEM

(71) Applicant: GE Avio Srl, Rivalta di Turin (IT)

(72) Inventors: Alessandro Bordoni, Rivalta di Turin (IT); Pietro Molesini, Castelnuovo del Garda (IT); Lorenzo Dal Mas, Turin (IT); Rosaria Conte, Turin (IT)

(73) Assignee: GE Avio S.r.l., Rivalta di Turin (IT)

( * ) Notice: Subject to any disclaimer, the term of this patent is extended or adjusted under 35 U.S.C. 154(b) by 576 days.

(21) Appl. No.: 16/922,319

(22) Filed: Jul. 7, 2020

(65) Prior Publication Data
US 2021/0025288 A1 Jan. 28, 2021

(51) Int. Cl.
*F28F 9/02* (2006.01)
*B22F 10/14* (2021.01)
(Continued)

(52) U.S. Cl.
CPC ............... *F28F 9/02* (2013.01); *B22F 10/14* (2021.01); *B22F 10/28* (2021.01); *F01D 25/12* (2013.01); *F02C 7/14* (2013.01); *F28D 7/00* (2013.01); *F28F 27/02* (2013.01); *B22F 10/12* (2021.01); *B22F 10/18* (2021.01); *B22F 10/25* (2021.01); *F05D 2260/205* (2013.01); *F05D 2260/213* (2013.01); *F05D 2260/98* (2013.01)

(58) Field of Classification Search
CPC .. F01D 25/12; F02C 7/14; F28F 27/02; F28D 7/00; F28D 2001/0273; F28D 1/05366; F28D 9/0012; F28D 2021/0089; F05D 2260/205; F05D 2260/213; F05D 2260/98
See application file for complete search history.

(56) References Cited

U.S. PATENT DOCUMENTS 3,353,590 A * 11/1967 Holman ................. F01M 1/10
165/158
5,499,675 A * 3/1996 Haasch ................ F28D 9/0012
165/157
(Continued)

FOREIGN PATENT DOCUMENTS

CN 207657600 U 7/2018
EP 2783775 A2 10/2014
WO WO2014/200587 A2 12/2014

OTHER PUBLICATIONS

Italian Search Report Corresponding to Application No. 201900012924 dated May 18, 2020.

*Primary Examiner* — Travis Ruby
(74) *Attorney, Agent, or Firm* — Dority & Manning, P.A.

(57) ABSTRACT

Cooling sub-systems and methods of manufacturing cooling sub-systems are provided. For example, a cooling sub-system comprises a heat exchanger and a manifold that comprises a first sensor seat and a first valve seat, which are in fluid communication with a flow of a working fluid through the heat exchanger and the manifold. The heat exchanger and manifold are integrally formed as a single unit. In some embodiments, the manifold further comprises a second sensor seat, a second valve seat, and a plurality of internal passageways, which fluidly connects the first and second sensor seats and the first and second valve seats a working fluid inlet and a working fluid outlet for an ingress of working fluid into and out of the manifold. The cooling sub-system may be manufactured by one or more additive manufacturing methods.

11 Claims, 8 Drawing Sheets

(51) Int. Cl.
  *B22F 10/28*   (2021.01)
  *F01D 25/12*   (2006.01)
  *F02C 7/14*    (2006.01)
  *F28D 7/00*    (2006.01)
  *F28F 27/02*   (2006.01)
  *B22F 10/12*   (2021.01)
  *B22F 10/18*   (2021.01)
  *B22F 10/25*   (2021.01)

(56) References Cited

U.S. PATENT DOCUMENTS

| | | |
|---|---|---|
| 9,739,171 B2 | 8/2017 | Blair et al. |
| 10,196,936 B2 | 2/2019 | Stearns et al. |
| 10,247,296 B2 | 4/2019 | van der Merwe et al. |
| 2014/0044525 A1* | 2/2014 | Storage ................... F28F 1/022 29/888.012 |
| 2015/0000865 A1* | 1/2015 | Ueda ......................... F28F 3/12 165/51 |
| 2015/0041414 A1* | 2/2015 | Squillante .............. B01D 35/18 210/774 |
| 2016/0116218 A1 | 4/2016 | Shedd et al. |
| 2017/0096938 A1 | 4/2017 | Kenworthy et al. |
| 2018/0023906 A1 | 1/2018 | Tajiri et al. |
| 2018/0163845 A1 | 6/2018 | Werwe et al. |
| 2018/0327920 A1 | 11/2018 | Tajiri et al. |
| 2019/0003390 A1 | 1/2019 | Ramos et al. |

* cited by examiner

INTEGRATED COOLING SUB-SYSTEM

GOVERNMENT SPONSORED RESEARCH

The project leading to this application has received funding from the Clean Sky 2 Joint Undertaking under the European Union's Horizon 2020 research and innovation program under grant agreement No. CS2-FRC-GAM 2018/2019-807090.

PRIORITY INFORMATION

The present application claims priority to Italian Patent Application No. 102019000012924 filed on 25 Jul. 2019.

FIELD

The present subject matter relates generally to thermal management systems, such as a cooling sub-system for use in engines and motors.

BACKGROUND

Often, working fluids of an engine or motor drive systems require cooling, e.g., to optimize performance of the machine. As an example, performance benefits may be gained by cooling lubrication oil for a gearbox or transmission of a turbomachine, such as a fan gearbox of a turbofan engine or a rotor drive system of an helicopter. Usually, a heat exchanger and various valves, filters, sensors, and the like are fluidly coupled using piping and fittings, and the working fluid is passed through this assembly, e.g., to cool the oil, e.g., through heat exchange with air or another cooler fluid. However, the multiple conduits, fittings, and interfaces provide multiple leak points, and such cooling systems require a relatively large overall envelope to accommodate the system. Further, the plurality of parts can complicate assembly of the system, as well as troubleshooting and resolving system issues, which can increase the complexity, time, and cost of maintenance and manufacture. Accordingly, improvements to thermal management systems, sub-systems, and/or features that help overcome these issues would be useful.

BRIEF DESCRIPTION

Aspects and advantages of the invention will be set forth in part in the following description, or may be obvious from the description, or may be learned through practice of the invention.

In one exemplary embodiment of the present subject matter, a cooling sub-system is provided. The cooling sub-system comprises a heat exchanger and a manifold that comprises a first sensor seat and a first valve seat. The first sensor seat and the first valve seat are in fluid communication with a flow of a working fluid through the heat exchanger and the manifold. The heat exchanger and the manifold are integrally formed as a single unit.

In another exemplary embodiment of the present subject matter, a method of manufacturing a cooling sub-system is provided. The method comprises depositing a layer of additive material on a bed of an additive manufacturing machine and selectively directing energy from an energy source onto the layer of additive material to fuse a portion of the additive material and form the cooling sub-system. The cooling sub-system comprises a heat exchanger and a manifold, and the manifold includes a first sensor seat and a first valve seat.

In one exemplary embodiment of yet another present subject matter, a cooling sub-system is provided. The cooling sub-system comprises a heat exchanger and a manifold that are integrally formed as a single unit. The manifold comprises a first sensor seat, a second sensor seat, a first valve seat, a second valve seat, and a plurality of internal passageways. The plurality of internal passageways includes a working fluid inlet for an ingress of working fluid into the manifold and a working fluid outlet for an egress of working fluid from the manifold. The plurality of internal passageways fluidly connects the first sensor seat, the second sensor seat, the first valve seat, and the second valve seat with the working fluid inlet and the working fluid outlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
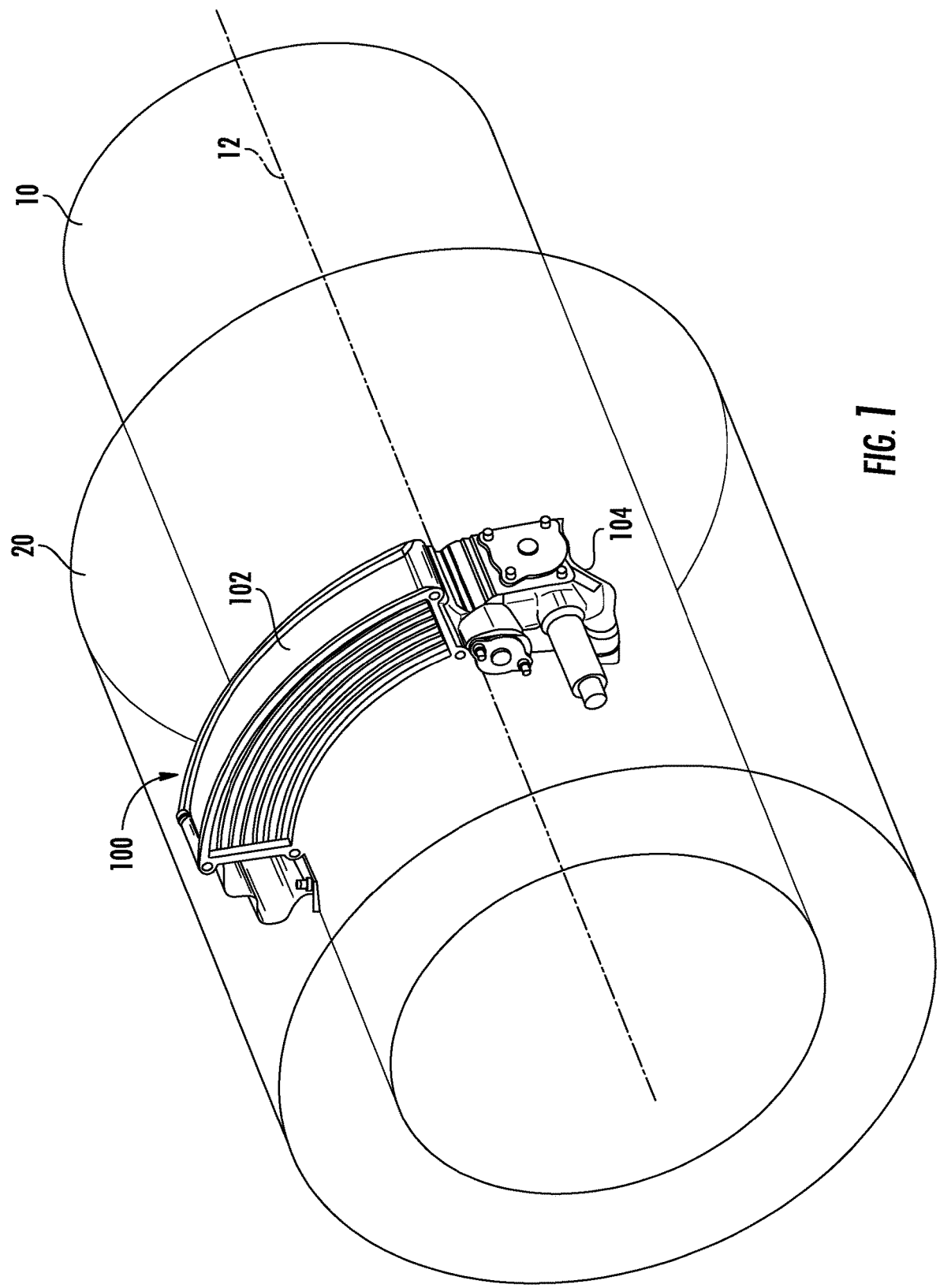
FIG. 1 provides a perspective view of a cooling sub-system mounted to a gearbox surrounded by a nacelle, such that the cooling sub-system is disposed between the gearbox and the nacelle, according to an exemplary embodiment of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
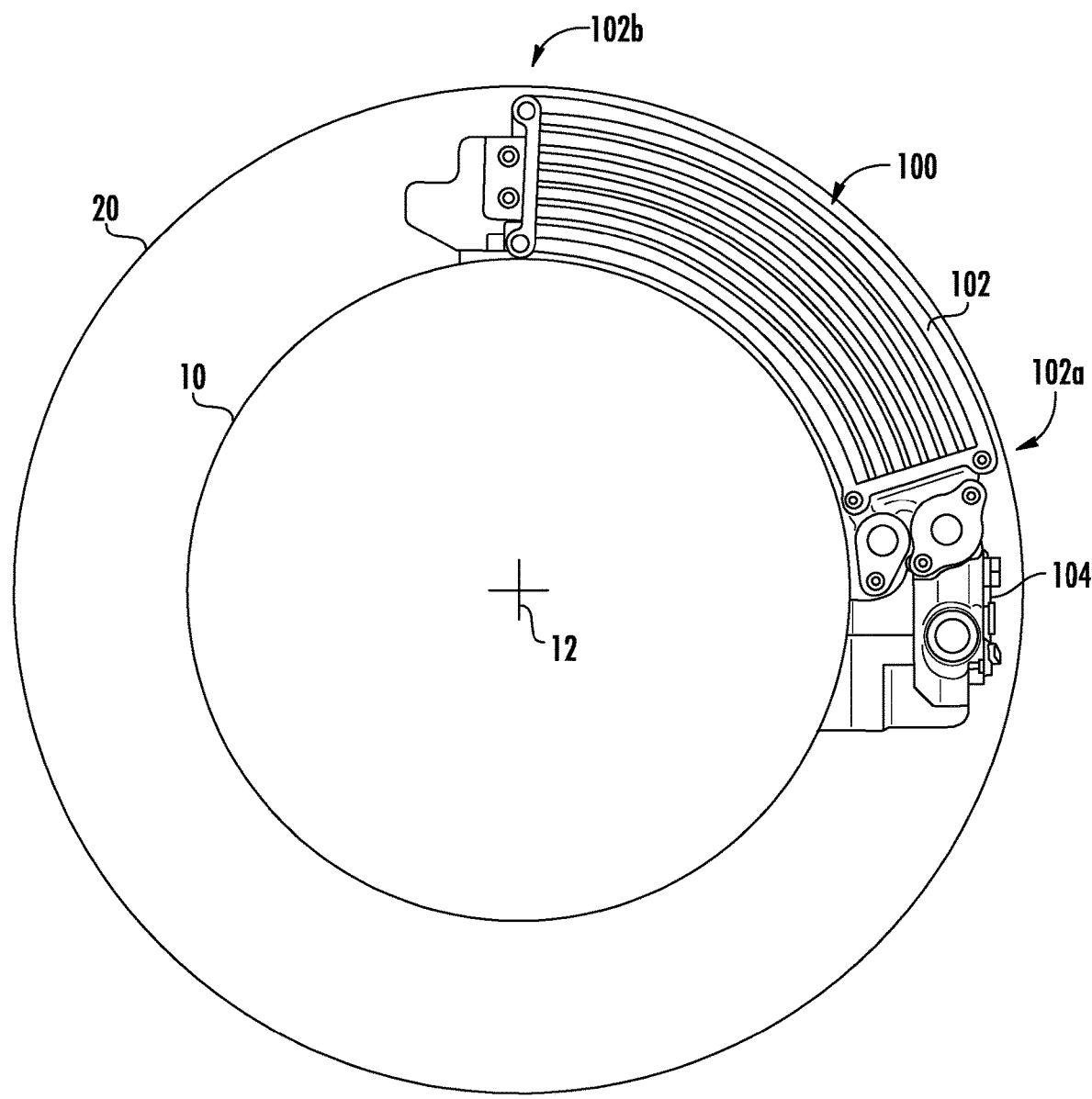
FIG. 2 provides an end view of the cooling sub-system, gearbox, and nacelle of FIG. 1.

Turning now to the drawings, wherein identical numerals indicate the same elements throughout the figures, FIG. 1 provides a perspective, schematic view and FIG. 2 provides an end, schematic view of a cooling sub-system 100 as installed as part of an assembly. It will be appreciated that the cooling sub-system 100 may be installed in any number of apparatus, devices, or systems for cooling one or more fluids. For example, the cooling sub-system 100 may be used to cool transmission oil of a gearbox or transmission 10 driving a rotor or propeller, such as a rotor or propeller driven by a gas turbine engine or by an electric motor, which in the exemplary embodiment of FIGS. 1 and 2, extends along an axial centerline 12 and is surrounded by a nacelle 20, which is constraining the installation space for the cooling sub-system 100. More particularly, in some embodiments, the cooling sub-system 100 may be an air cooled oil cooler. The cooling sub-system 100 may be configured for mounting to a gearbox 10 to cool lubrication oil flowing through the gearbox 10, and the cooling sub-system 100 may be directly installed without any pipe connection between the gearbox 10 and the sub-system 100. It will be appreciated that the present subject matter may be applicable to any type of transmission, engine, or motor. For instance, the present subject matter may be suitable for use with or in turbofan engines, turboprops, turboshafts, turbojets, industrial and marine gas turbine engines, helicopter rotor drive systems, propeller drive systems and/or their power units, electrical and/or hybrid aero-engines, electrical and/or hybrid engines. Further, as explained in greater detail herein, the cooling sub-system 100 is formed as a single unit, e.g., such that the cooling sub-system 100 includes in a single part a heat exchanger, the seats for all main equipment of the associated hydraulic circuit (e.g., valves, filters, sensors, strainers), and related fluidic connections between components of the circuit. Moreover, the single part cooling sub-system 100 is formed in a way it can be installed close to the gearbox or transmission 10 or engine/motor.

Referring generally to FIGS. 1 and 2, the cooling sub-system includes a heat exchanger 102 and a manifold 104. As stated, the heat exchanger 102 and the manifold 104, with their various components and portions as described herein, are integrally formed as a single unit. The heat exchanger 102 and the manifold 104 may be integrally formed by any suitable process, e.g., an additive manufacturing process. Such formation may allow the cooling sub-system 100 to have a shape such that the sub-system 100 to conform to, complement, or fit the space and/or air flow characteristics of the area in which the sub-system 100 is installed.

As illustrated in the exemplary embodiment of FIG. 2, the cooling sub-system 100 is in the form of an arc or partial annulus. More specifically, the heat exchanger 102 of the sub-system 100 has an arc shape or partial annular shape. For example, several different heat exchanger shapes and layouts can be designed, depending on air flow characteristics and available space, adapting to surrounding geometry, so that a suitable package for different helicopter applications, aero-engine regions, or turbomachinery applications may be designed. By adapting to the surrounding geometry, overall envelope of the cooling system 100 may be reduced. It will be understood that the cooling sub-system 100, or any portion thereof, such as the heat exchanger 102, may be formed to have an appropriate or desired shape for the area in which the cooling sub-system 100 is installed. That is, the cooling sub-system 100 may have any shape that complies with the constraints of is installed location and/or required function(s). As such, the shape of the cooling sub-system 100 may vary from one embodiment to another, with the various shapes conforming to the particular constraints of different installation locations and/or applications. For instance, the radial envelope of the cooling sub-system 100, comprising the heat exchanger 102 and oil system accessories of the manifold 104, may be customized, which may provide a significant reduction of the radial envelope compared to known designs. Further, a customized radial envelope of the sub-system 100 may allow the cooling sub-system package to be installed on a gearbox housing and cope with the radial envelope of a surrounding nacelle 20, which may also ease integration with an air flow duct.

Figure 3:
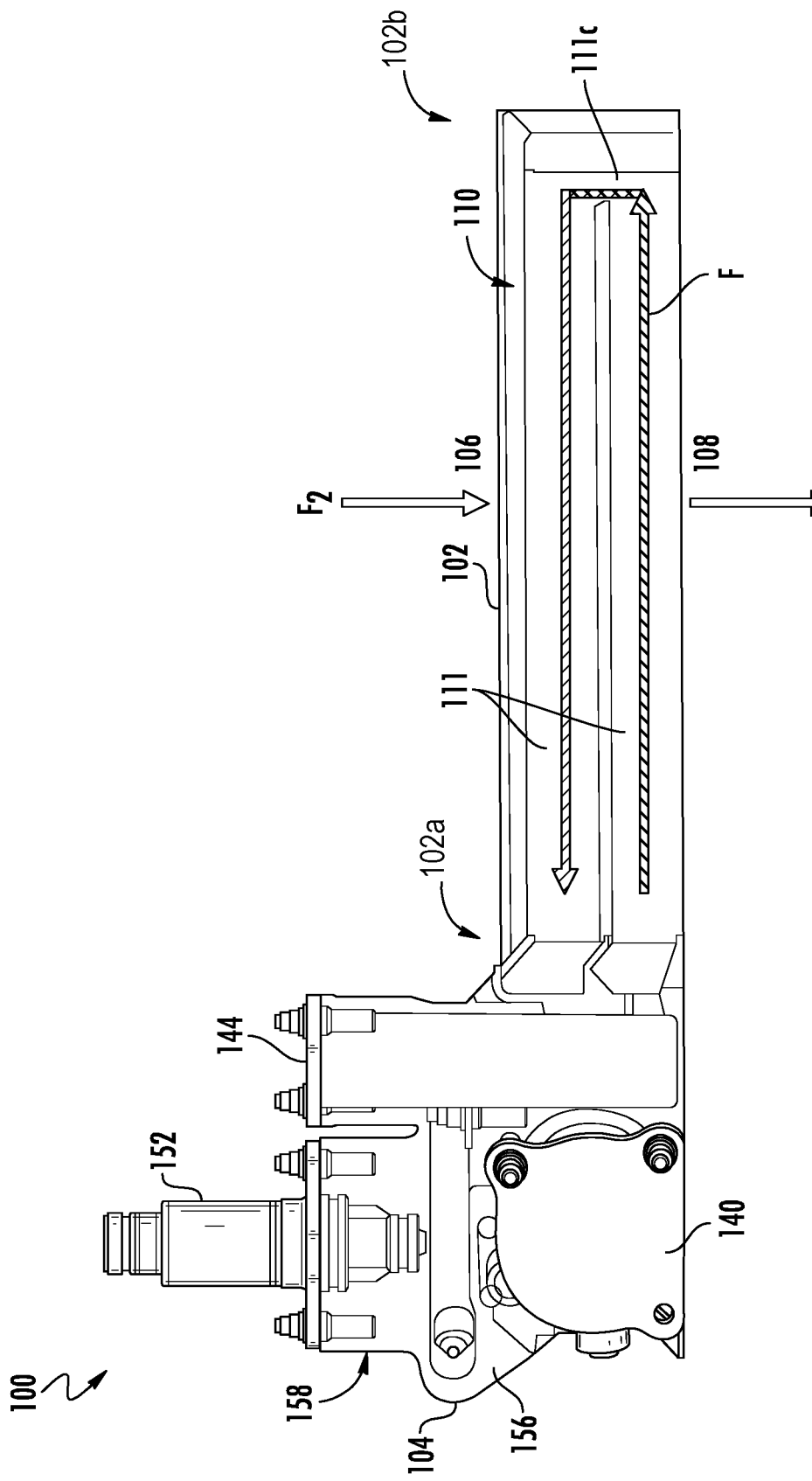
FIG. 3 provides a top view of the cooling sub-system of FIG. 1.

As shown in the exemplary embodiment of FIG. 3, the heat exchanger 102 comprises an air inlet area 106 and an air outlet area 108, such that air flows through the heat exchanger 102 from the inlet area 106 to the outlet area 108. The air inlet area 106 and the air outlet area 108 also may be referred to as a second working fluid inlet 106 and a second working fluid outlet 108, respectively, as explained below. The heat exchanger 102 further comprises a flow path 110 for a working fluid F. The working fluid flow path 110 is disposed between the air inlet area 106 and the air outlet area 108. More particularly, the flow path 110 is disposed such that heat exchange may occur between the air flowing through the heat exchanger 102 and the working fluid F flowing through the fluid flow path 110. For example, as illustrated in FIGS. 1-4, the working fluid flow path 110 comprises a plurality of connected passageways or conduits 111, and each passageway 111 extends from a first end 102a of the heat exchanger 102 at the manifold 104 to a second end 102b opposite the manifold 104. In the exemplary embodiment, each passageway 111 has an arc shape or a partial annular shape, conforming to the shape of the heat exchanger 102 of the cooling sub-system 100. As depicted in FIG. 3, adjacent passageways 111 may be connected at either the first end 102a or the second end 102b by a connector conduit 111c, such that the plurality of passageways 111 are in fluid communication, thereby defining the flow path 110 through which flows the working fluid F.

A coolant stream, e.g., air, may be ducted to the heat exchanger portion 102 of the cooling sub-system 100 from anywhere. That is, the coolant stream may be ducted to the air inlet area 106 such that the coolant may flow through the heat exchanger 102 to cool the working fluid F. For instance, the coolant may be ducted from outside the turbomachine in which the cooling sub-system 100, e.g., the coolant may be ambient air, or the coolant may be ducted from an intake or discharge area of the turbomachine. In other embodiments, the working fluid F may be the coolant stream such that the air is cooled. In still other embodiments, the heat exchanger 102 may utilize a fluid other than air to exchange heat with the working fluid F. Stated generally, a second working fluid $F_2$ flows from the second working fluid inlet 106 to the second working fluid outlet 108 of the heat exchanger 102 to exchange heat with the working fluid F flowing through the flow path 110, and in exemplary embodiments, the second working fluid $F_2$ is air.

As shown most clearly in FIGS. 4-7, the manifold 104 comprises a plurality of seats for sensors, valves, and other such equipment. More particularly, in the depicted exemplary embodiment, the manifold 104 comprises a first sensor seat 112 and a second sensor seat 114. Further, as illustrated, the manifold 104 may comprise a first valve seat 116 and a second valve seat 118. Moreover, in embodiments in which the working fluid F is oil, e.g., for lubrication within a fan gearbox of a turbofan engine or other gearbox of a rotor drive system of a helicopter or bearings of an electric motor, the manifold 104 also may comprise an oil filter seat 120 and a strainer seat 122. It will be appreciated that if the working fluid F is a fluid other than oil, the oil filter seat 120 and/or strainer seat 122 may be omitted and/or other equipment or equipment seats may be included in the manifold 104. For example, the oil filter seat 120 generally may be a working fluid filter seat 120. The working fluid F may be any suitable fluid for use within the particular system, device, or apparatus in which the cooling sub-system 100 is installed.

Figure 5:
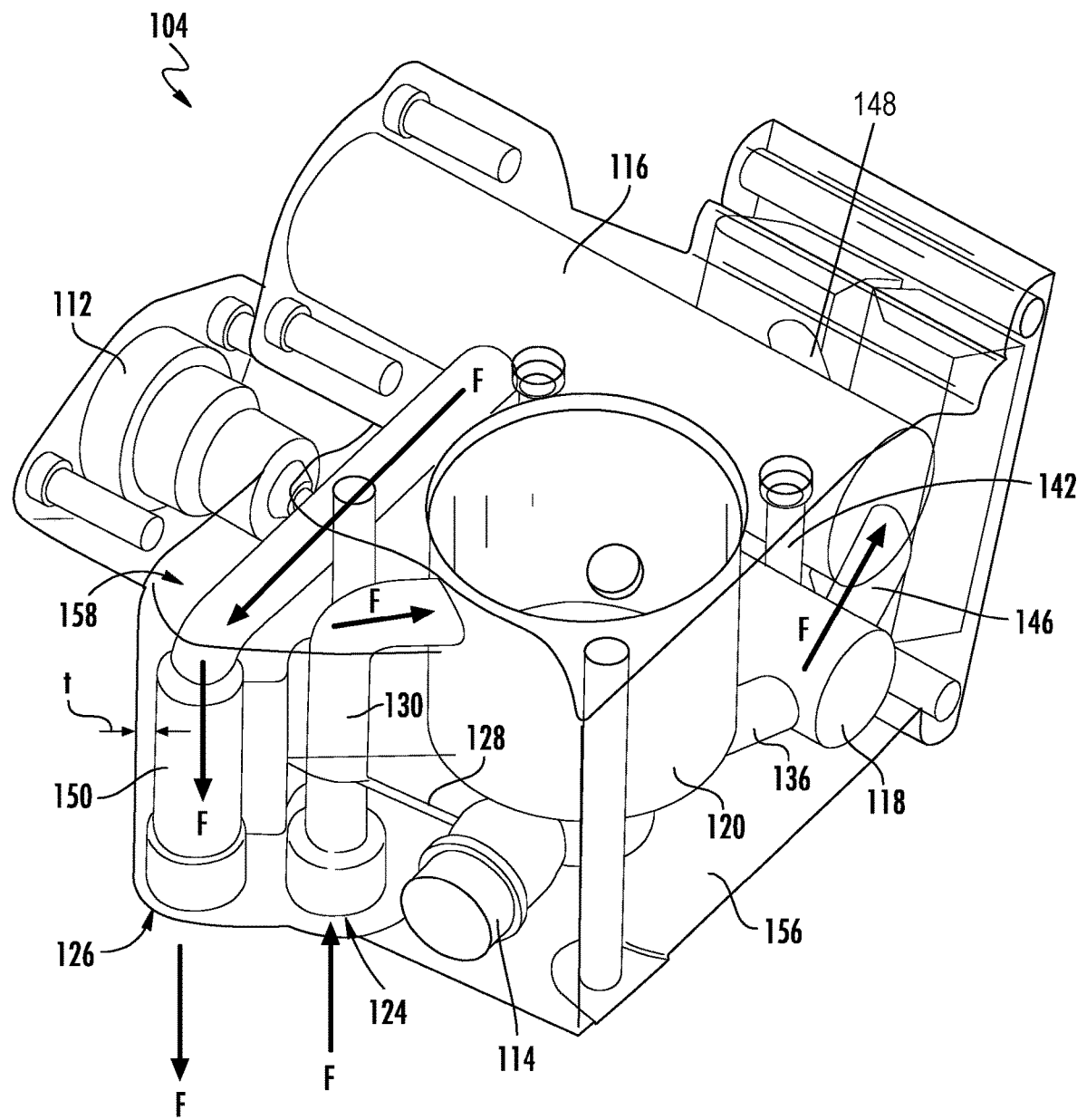
FIG. 5 provides a partially translucent top view of the manifold of FIG. 4.

As illustrated, e.g., in FIG. 5, the manifold 104 also comprises a working fluid inlet 124 and a working fluid outlet 126. It will be appreciated that the working fluid inlet 124 and working fluid outlet 126 connect to one or more external passageways or conduits through which the working fluid F is transferred. As will be understood from the description herein and the figures, the working fluid inlet 124 and the working fluid outlet 126 form a single fluidic interface between the cooling sub-system 100 and components external to the sub-system 100. That is, in exemplary embodiments, the working fluid F has only one entrance point and one exit point with respect to the sub-system 100—working fluid inlet 124 for an ingress or entrance of the working fluid F into the manifold 104 and working fluid outlet 126 for an egress or exit of the working fluid F from the manifold 104. Internal passageways or fluid lines are defined from the working fluid inlet 124 to the working fluid outlet 126 to fluidly connect the inlet 124 with the outlet 126. As depicted in the exemplary embodiment of FIGS. 5-7, a first internal passageway 128 is defined in the manifold 104 from a working fluid inlet passageway 130 to the second sensor seat 114, and a second internal passageway 132 is defined in the manifold 104 from the working fluid filter seat 120 to the second sensor seat 114. The working fluid inlet passageway 130 may be defined in the manifold 104 from the working fluid inlet 124 to the working fluid filter seat 120, as shown, e.g., in FIGS. 5 and 6.

Figure 6:
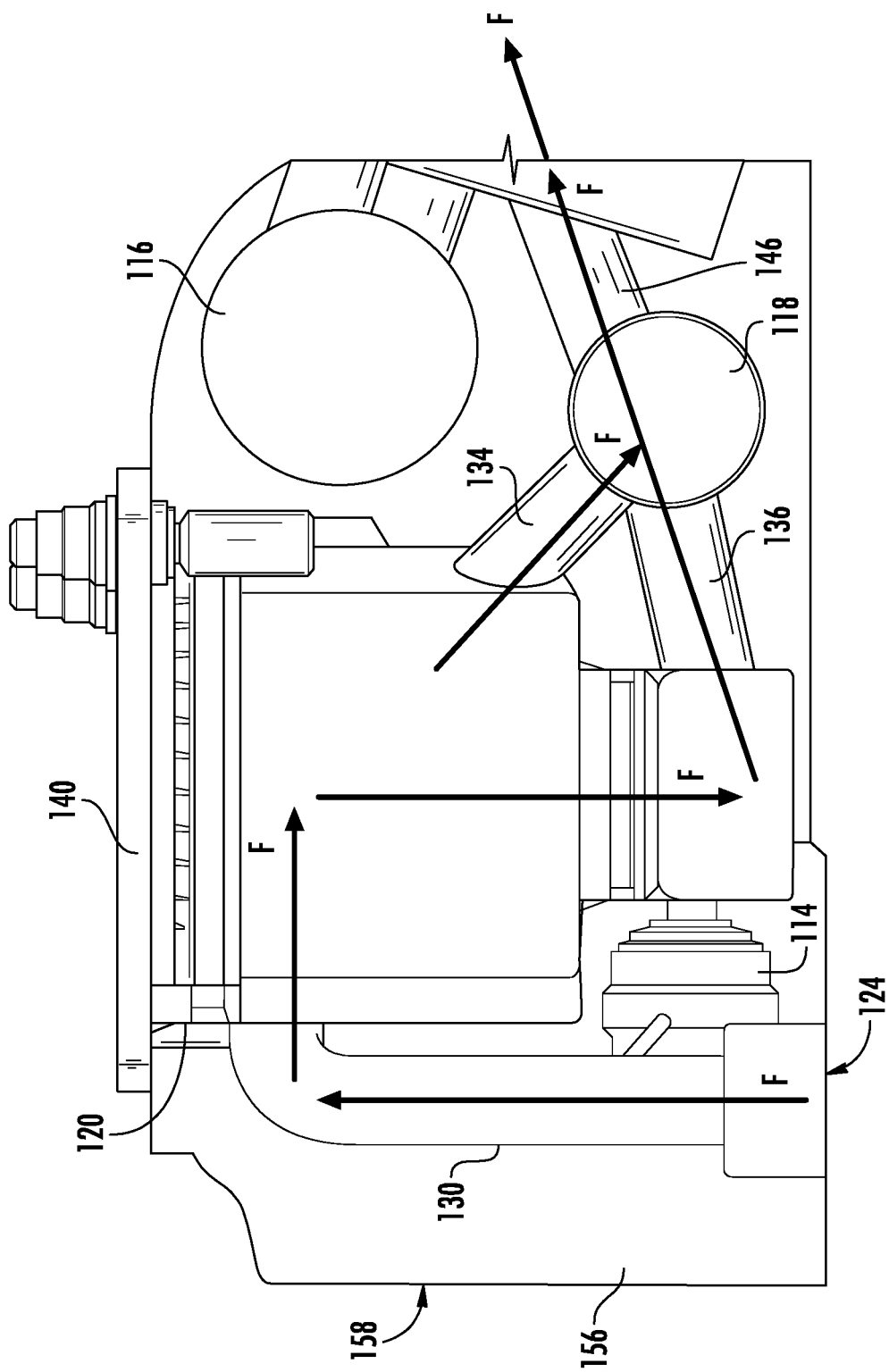
FIG. 6 provides a partially translucent side view of the manifold of FIG. 4.
Figure 7:
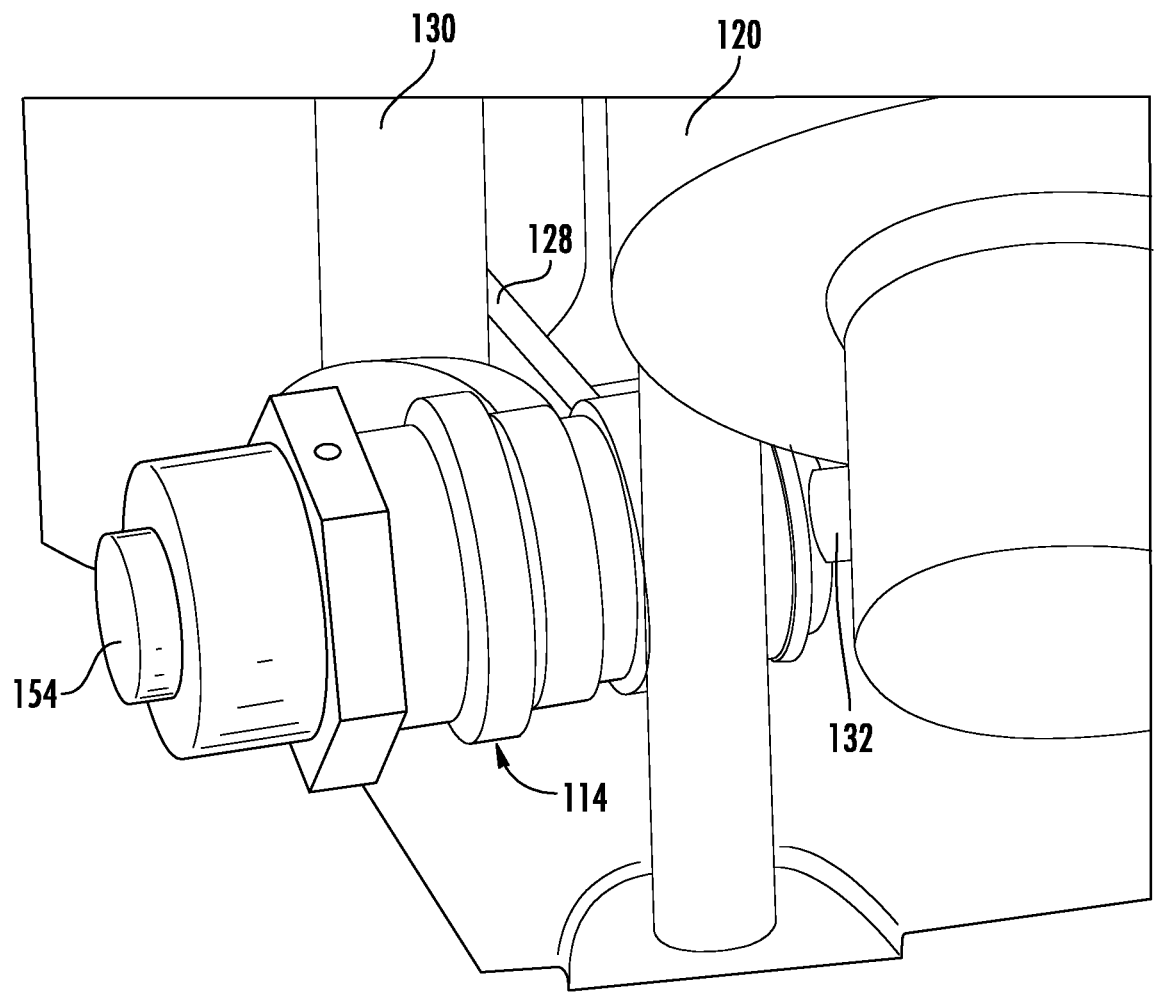
FIG. 7 provides a partially translucent, close-up view of a first sensor seat portion of the manifold of FIG. 4.

Further, as shown most clearly in FIG. 6, the exemplary embodiment comprises a third internal passageway 134 defined in the manifold 104 from the working fluid filter seat 120 to the second valve seat 118 and a fourth internal passageway 136 defined in the manifold 104 from the filter seat 120 to the second valve seat 118. More particularly, a second valve 138 (FIG. 4) may be disposed in the second valve seat 118, and the second valve may be a bypass valve that allows bypass of a filter 140 disposed in the working fluid filter seat 120, i.e., the second valve 138 controls whether the working fluid F flows through the filter 140 or bypasses the filter 140. As such, the third internal passageway 134 may allow the working fluid F to bypass of the filter 140 and flow to the second valve 138. For example, in case of a blockage in the filter 140, the third internal passageway 134 and the second valve 138 may be used to bypass the filter 140. The fourth internal passageway 136 may allow the working fluid F that flows through the filter 140 (rather than bypassing the filter 140) to flow from the filter 140 in the working fluid filter seat 120 to second valve seat 118.

A fifth internal passageway 142 may be defined in the manifold 104 from the second valve seat 118 to the first valve seat 116. In some embodiments, a first valve 144 (FIG. 4) disposed in the first valve seat 116 is a bypass valve that allows bypass of the heat exchanger 102. That is, the first valve 144 may control whether the working fluid F flows through the heat exchanger 102 of the cooling sub-system 100 or bypasses the heat exchanger 102 and, thus, flows only through the manifold 104 of the cooling sub-system 100. For instance, the first valve 144 may be used to bypass the heat exchanger 102 if the working fluid F, e.g., lubrication oil, is cold and would not benefit from heat exchange with the air passing through the heat exchanger 102. Thus, the first valve 144 and second valve 138 may be thermal and/or mechanical bypass valves for routing the working fluid F away from the oil filter 140 and the heat exchanger 102, respectively.

Moreover, in the illustrated embodiment, a sixth internal passageway 146 is defined in the manifold 104 from the second valve seat 118 to the heat exchanger 102, i.e., from the second valve seat 118 to the working fluid flow path 110. Similarly, a seventh internal passageway 148 is defined in the manifold 104 from the heat exchanger 102 to the first valve seat 116, i.e., from the working fluid flow path 110 to the first valve seat 116. As further depicted in the exemplary embodiment, a working fluid outlet passageway 150 is defined in the manifold 104 from the first valve seat 116 to the working fluid outlet 126. The first sensor seat 112 may be disposed in fluid communication with the working fluid outlet passageway 150, as shown in FIG. 5.

As illustrated in the figures, the plurality of internal passageways 128, 130, 132, 134, 136, 142, 146, 148, 150, including the working fluid flow path 110, may each have a unique geometry. The geometry of each internal passageway 110, 128, 130, 132, 134, 136, 142, 146, 148, 150 may be configured, e.g., to optimize the footprint, performance, etc. of the cooling sub-system 100 module. More particularly, each internal passageway 110, 128, 130, 132, 134, 136, 142, 146, 148, 150 may be defined at a unique angle or position with respect to a reference axis or surface of the cooling sub-system 100, e.g., to help optimize the shape and size of the cooling sub-system 100 based on its installation location. Further, each internal passageway 110, 128, 130, 132, 134, 136, 142, 146, 148, 150 may have a cross-sectional shape and/or dimension for optimizing the footprint and/or performance of the cooling sub-system 100.

Figure 4:
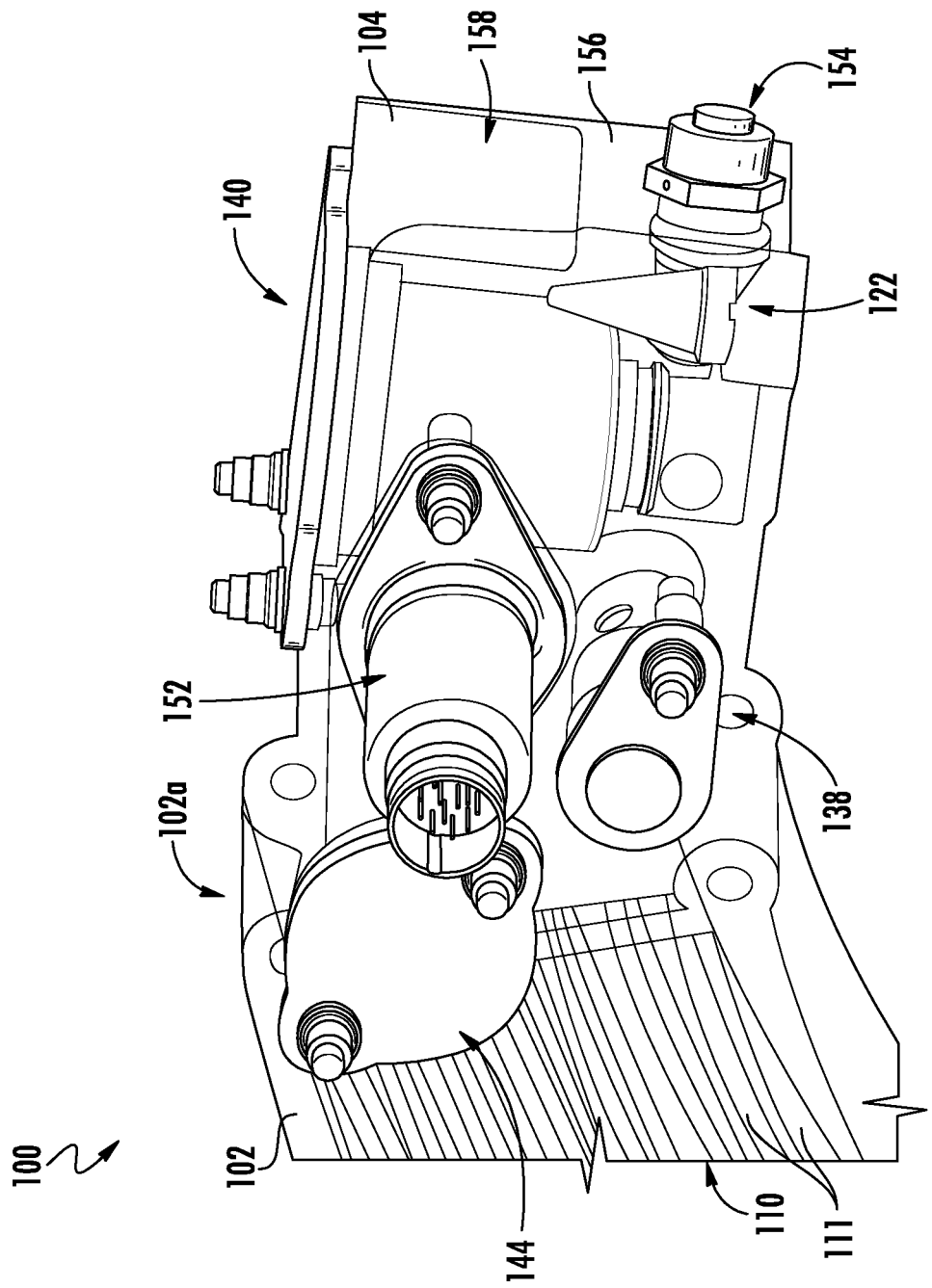
FIG. 4 provides a partially translucent side view of a manifold and a portion of a heat exchanger of the cooling sub-system of FIG. 1.

Referring particularly to FIG. 4, a first sensor 152 may be disposed in the first sensor seat 112, and a second sensor 154 may be disposed in the second sensor seat 114. In some embodiments, the first sensor 152 may be a pressure transducer that senses the pressure of the working fluid F, and the second sensor 154 may be a temperature, flow rate, or pressure sensor or the like. Thus, in embodiments in which the working fluid F is a lubrication oil, the first sensor 152 may be an oil pressure transducer.

As further illustrated in the exemplary embodiment, the manifold 104 includes an outer wall 156 that defines an outer surface 158 of the manifold 104. The plurality of internal passageways 128, 130, 132, 134, 136, 142, 146, 148, 150 are defined inward of the outer wall 156 such that a thickness t (FIG. 5) of material from which the manifold is formed is disposed between the outer surface 158 of the manifold 104 and the internal passageways 128, 130, 132, 134, 136, 142, 146, 148, 150. The thickness t may vary throughout the manifold 104 such that more or less material may be disposed between an internal passageway 128, 130, 132, 134, 136, 142, 146, 148, 150 and the outer surface 158 at various locations along the manifold 104.

It will be appreciated that the plurality of internal passageways 128, 130, 132, 134, 136, 142, 146, 148, 150 form a working fluid flow path through the manifold 104 and fluidly connect the working fluid inlet 124 with the working fluid outlet 126. Further, it will be understood that the plurality of internal passageways 128, 130, 132, 134, 136, 142, 146, 148, 150, as well as the working fluid flow path 110 through the heat exchanger 102, may be portions of a single conduit extending from the working fluid inlet 124 to the working fluid outlet 126 and forming a flow path for the working fluid F through the cooling sub-assembly 100. The various valve, sensor, and filter seats 112, 114, 116, 118, 120, 122 are disposed along the working fluid flow path defined in the manifold 104 such that equipment such as valves, sensors, and filters/strainers may be positioned in fluid communication with the working fluid F. As such, various parameters of the working fluid F may be sensed and/or measured, e.g., using first and/or second sensors 152, 154, and the flow of the working fluid F may be controlled by one or more valves, such as first and/or second valves 144, 138. One or more filters and/or strainers, such as oil filter 140 and strainer 122, may be disposed in the flow of working fluid F to help clear debris and/or other contaminants from the working fluid F, e.g., to improve the flow characteristics and/or heat exchange capacity of the working fluid F. In some embodiments, the strainer 122 may be positioned in the working fluid inlet passageway 130, e.g., to collect debris or contaminants as the working fluid enters the cooling sub-system 100, and the filter 140 may be positioned downstream of the heat exchanger 102.

In general, the exemplary embodiments of the cooling sub-system 100 described herein may be manufactured or formed using any suitable process. However, in accordance with several aspects of the present subject matter, the single unit cooling sub-system 100 may be formed using an additive-manufacturing process, such as a 3D printing process. The use of such a process may allow the cooling sub-system 100 to be formed integrally, as a single monolithic component, or as any suitable number of sub-components. In particular, the manufacturing process may allow the cooling sub-system 100 to be integrally formed and include a variety of features not possible when using prior manufacturing methods. For example, the additive manufacturing methods described herein enable the manufacture of cooling sub-systems having any suitable size and shape with one or more configurations of equipment seats, internal passageways, and heat exchanger features, as well as other features which were not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although additive manufacturing processes for forming the components described herein are described in detail, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface, then allowing, for instance, heat exchanger performance optimization. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous material (e.g., metal) and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage and joint quality between separate parts may advantageously be reduced, whereas overall performance may be increased.

Also, the additive manufacturing methods described above enable much more complex and intricate shapes and contours of the components described herein. For example, such components may include thin additively manufactured layers and unique internal passageway geometries, such as internal passageways defined at angles and/or having cross-sectional shapes and/or areas to optimize the footprint of the cooling sub-system. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved performance and reliability.

Now that the construction and configuration of the cooling sub-system 100 according to an exemplary embodiment of the present subject matter has been presented, an exemplary method 800 is provided for forming a cooling sub-system according to an exemplary embodiment of the present subject matter. Method 800 can be used by a manufacturer to form the cooling sub-system 100, or any other suitable cooling sub-system. It should be appreciated that the exemplary method 800 is discussed herein only to describe exemplary aspects of the present subject matter and is not intended to be limiting.

Figure 8:
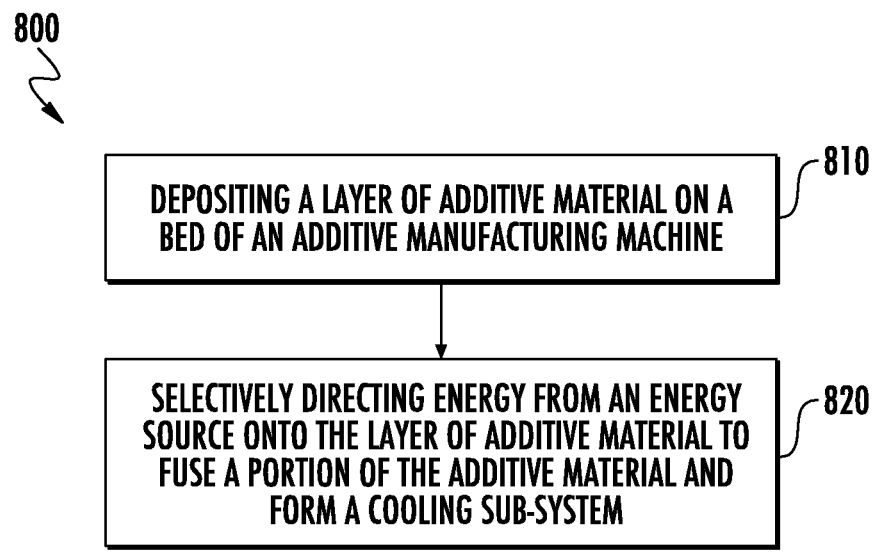
FIG. 8 provides a flow diagram of a method for forming a cooling sub-system having an integral heat exchanger and manifold according to an exemplary embodiment of the present subject matter.

Referring now to FIG. 8, method 800 includes, at step 810, depositing a layer of additive material on a bed of an additive manufacturing machine. Method 800 further includes, at step 820, selectively directing energy from an energy source onto the layer of additive material to fuse a portion of the additive material and form a cooling sub-system. For example, using the example from above, the cooling sub-system 100 may be formed for a gearbox of an aero-engine.

The additively manufactured cooling sub-system 100 may include a heat exchanger 102 and a manifold 104. The heat exchanger 102 may define an air inlet area 106 and an air outlet area 108, with a working fluid flow path 110 extending therebetween. The manifold 104 may define a first sensor seat 112, a second sensor seat 114, a first valve seat 116, and a second valve seat 118. Also, the manifold may define a working fluid filter seat 120, such as an oil filter seat. The manifold 104 may further define a working fluid inlet 124 and a working fluid outlet 126, with a plurality of internal passageways 128, 130, 132, 134, 136, 142, 146, 148, 150 fluidly connecting the inlet 124, the working fluid flow path 110, and the outlet 126. The sensor seats 112, 114, valve seats 116, 118, and filter seat 120 may be in fluid communication with the plurality of internal passageways 128, 130, 132, 134, 136, 142, 146, 148, 150, such that, e.g., a sensor positioned in each respective sensor seat 112, 114, a valve positioned in each respective valve seat 116, 118, and a filter positioned in the working fluid filter seat 120 may be in fluid communication with a working fluid F flowing through the flow path defined by the passageways 110, 128, 130, 132, 134, 136, 142, 146, 148, 150. Notably, the heat exchanger 102 and the manifold 104 are integrally formed during the additive manufacturing process such that the heat exchanger 102 and the manifold 104 are a single, integral component.

FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 800 are explained using the cooling sub-system 100 as an example, it should be appreciated that these methods may be applied to manufacture any suitable cooling sub-system. Additionally, although only an additive manufacturing method is described in detail herein, it will be understood that the cooling sub-system 100, having an integral heat exchanger 102 and manifold 104, can be formed by other suitable methods, such as casting in a suitable mold or the like.

Various embodiments of a cooling sub-system and a method for manufacturing a cooling sub-system are described above. Notably, the cooling sub-system 100 generally may include geometries and configurations whose practical implementations are facilitated by an additive manufacturing process, as described herein. For example, using the additive manufacturing methods described herein, the cooling sub-system 100 may include a heat exchanger 102 and a manifold 104, which comprises a plurality of equipment seats and fluid passageways, that are integrally formed as a single unit. In exemplary embodiments, the integrated cooling sub-system 100 is a sub-assembly including a majority of the components of a transmission oil cooling system, including in a single part or casing both the main heat exchanger (e.g., an air cooled oil cooler), the seats for all main equipment of the associated hydraulic circuit (e.g., valves, filters, sensors, strainers), and related fluidic connections between components of the oil circuit. By taking advantage of additive manufacturing technology, the cooling sub-system 100 may feature fluidic connections, e.g., internal passageways, between the components of the sub-system having a diameter, thickness, and/or routing layout not achievable with conventional machining or casting technologies.

Additionally or alternatively, the cooling sub-system 100 may be shaped to allow direct assembly on a gearbox, transmission, or the like by providing a single interface for all fluidic connections. For instance, several different internal passageway network layouts and/or heat exchanger shapes may be used, which may optimize cooling and system integration. As a result, the sub-system 100 may be an "add-on kit" or a standalone part, i.e., a sub-system that may be pre-assembled and/or tested prior to installation and then easily installed. Further, the heat exchanger portion of the sub-system 100 and the equipment seats may be designed to fit the available installation space and to comply with the air flow characteristics of a particular installation location, which may help the heat exchanger achieve a high exchanged heat to envelope ratio. Although described herein with respect to a gearbox or transmission of a turbomachine, the present subject matter also may be applied to other oil or hydraulic sub-systems of the turbomachine, e.g., an under-cowl or ADT compact sub-system or external surface cooler and valves package of an aero-engine. Further, it may be applied to other motors and engines, such as motor vehicles and/or electrical applications, wherein cooling capability is required and an available installation envelope is reduced and/or features complex shape(s). Moreover, the features of the cooling sub-system 100 described herein may significantly reduce oil routing and overall envelope of the cooling sub-system, which may provide easy accessibility and faster replacement, as well as improved packaging, e.g., in a gearbox or under-cowl.

Further, through the reduction or elimination of piping, external connections, and lower part count, the reliability of the cooling sub-system 100 may be enhanced, the time to assemble the sub-system 100 may be reduced, and/or the complexity of maintenance once the sub-system 100 is in service may be reduced (i.e., the sub-system 100 may be easier to maintain than other designs). More particularly, in exemplary embodiments in which the cooling sub-system 100 is a transmission oil cooling sub-system, all external oil piping is avoided or eliminated, with only a single external interface between the cooling sub-system 100 and external components, providing reliability enhancement. Removal of all pipes and fittings of the oil cooling system by integration of the equipment (e.g., valves, oil filter, strainer, pressure sensors) with a heat exchanger in a single casing or as a single unit may also achieve significant system weight reduction. Moreover, the cooling sub-system 100 may allow an improvement in maintenance actions of the oil system components, which are usually individual line replaceable components, because all parts of the cooling sub-system 100 are grouped in the same location defining an integrated line replaceable sub-system. Further, in case of an issue with the cooling sub-system 100, the whole sub-system 100 may be relatively quickly replaced on wing, which may minimize AOG trouble shooting (e.g., oil leakages) that may be done off-wing on the replaced sub-system 100. For instance, as described herein, the cooling sub-system 100 may have a single external interface for all fluidic passageways within the sub-system 100, which may enable the sub-system 100 to be tested separately from the apparatus, device, or system in which the sub-system 100 is installed.

Additionally or alternatively, development and procurement lead time generally may be reduced, e.g., due to producing the cooling sub-system by additive manufacturing. Further, both thermal exchange and working fluid drop pressure performance may be improved, e.g., due to lower piping losses and exchanger geometry that traditional heat exchanger and piping cannot reach.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A cooling sub-system, comprising:
a heat exchanger; and
a manifold comprising:
  a working fluid inlet;
  a working fluid inlet passageway and a working fluid outlet passageway;
  a first sensor seat, wherein the first sensor seat is connected to the working fluid outlet passageway;
  a working fluid filter seat, wherein the working fluid inlet passageway extends from the working fluid inlet to the working fluid filter seat;
  a second sensor seat connected to the working fluid filter seat, the second sensor seat configured to position a sensor in fluid communication with the working fluid filter seat;
  a plurality of internal passage ways including a first internal passageway, a second internal passageway, a third internal passageway, a fourth internal passageway, a fifth internal passageway, and a sixth internal passageway each respective internal passageway configured for flowing a working fluid therethrough, wherein the first internal passageway extends from the working fluid inlet passageway to the second sensor seat, wherein the second internal passageway extends from the second sensor seat to the working fluid filter seat;
  a first valve seat;
  a second valve seat downstream of the first valve seat;
  wherein the first sensor seat and the first valve seat are in fluid communication with the flow of the working fluid through the heat exchanger and the manifold,
  wherein the third internal passageway extends between the working fluid filter seat and the second valve seat, the third internal passageway configured for the flow of the working fluid to bypass a filter disposed in the working fluid filter seat,
  wherein the fourth internal passageway extends from the working fluid filter seat downstream of the third internal passageway to the second valve seat,
  wherein the fifth internal passageway extends from the second valve seat to the first valve seat, the fifth internal passageway configured for the flow of the working fluid to bypass the heat exchanger,
  wherein the sixth internal passageway extends from the second valve seat to a working fluid flow path extending through the heat exchanger, and
  wherein the heat exchanger and the manifold are integrally formed as a single unit.

2. The cooling sub-system of claim 1, wherein the plurality of internal passageways fluidly connects the working fluid inlet to the working fluid outlet, and
wherein the first sensor seat and the first valve seat are disposed along the plurality of internal passageways.

3. The cooling sub-system of claim 1, wherein the heat exchanger comprises a second working fluid inlet and a second working fluid outlet.

4. The cooling sub-system of claim 1, wherein the heat exchanger has a first end, a second end, and an arc shaped portion extending between the first end and the second end, and wherein the manifold is connected to the second end of the heat exchanger.

5. The cooling sub-system of claim 1, wherein the cooling sub-system is incorporated into a gearbox to cool lubrication oil flowing through the gearbox.

6. The cooling sub-system of claim 1, wherein the cooling sub-system is incorporated into a turbomachine to cool a fluid flowing through an engine of the turbomachine.

7. The cooling sub-system of claim 1, wherein the cooling sub-system is incorporated into an electrical motor to cool a fluid flowing through the electrical motor.

8. The cooling sub-system of claim 1, wherein the cooling sub-system comprises:
a plurality of layers formed by:
  depositing a layer of additive material on a bed of an additive manufacturing machine; and
  selectively directing energy from an energy source onto the layer of additive material to fuse a portion of the additive material.

9. The cooling sub-system of claim 1, wherein the working fluid filter seat includes a first portion having a first diameter and a second portion having a second diameter, the second diameter is less than the first diameter, and wherein the second portion extends from the first portion.

10. The cooling sub-system of claim 9, wherein the working fluid inlet passageway extends from the working fluid inlet to the first portion of the working fluid filter seat, wherein the second sensor seat extends to the second portion of the working fluid filter seat, wherein the third internal passageway extends from the first portion of the working fluid filter seat to the second valve seat, and wherein the fourth internal passageway extends from the second portion of the working fluid filter seat to the second valve seat.

11. The cooling sub-system of claim 1, wherein the plurality of internal passageways fluidly connects the first sensor seat, the second sensor seat, the first valve seat, and the second valve seat with the working fluid inlet and the working fluid outlet.

* * * * *